(12) United States Patent
Lee et al.

(10) Patent No.: US 11,693,279 B1
(45) Date of Patent: Jul. 4, 2023

(54) ADJUSTABLE WINDOWS

(71) Applicant: Apple Inc., Cupertino, CA (US)

(72) Inventors: Yunseok Lee, Santa Clara, CA (US);
Haiqing Xianyu, Cupertino, CA (US);
Junhwan Lim, San Jose, CA (US);
Peter F Masschelein, Campbell, CA (US); Sang Un Choi, San Jose, CA (US); Xiaokai Li, Mountain View, CA (US); Yuan Chen, Campbell, CA (US); Zhibing Ge, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/683,731

(22) Filed: Mar. 1, 2022

Related U.S. Application Data

(60) Provisional application No. 63/162,767, filed on Mar. 18, 2021.

(51) Int. Cl.
| | | |
|---|---|---|
| *G02F 1/1339* | (2006.01) | |
| *B60J 3/04* | (2006.01) | |
| *G02F 1/137* | (2006.01) | |
| *G02F 1/1343* | (2006.01) | |

(52) U.S. Cl.
CPC ............. *G02F 1/1339* (2013.01); *B60J 3/04* (2013.01); *G02F 1/13725* (2013.01); *G02F 1/134309* (2013.01)

(58) Field of Classification Search
CPC ..................................................... G02F 1/1339
See application file for complete search history.

(56) References Cited

U.S. PATENT DOCUMENTS

| | | | |
|---|---|---|---|
| 9,097,931 B2 | 8/2015 | Li et al. | |
| 9,971,222 B2 * | 5/2018 | Kim | ....................... G02F 1/1334 |
| 10,061,164 B2 | 8/2018 | Kim et al. | |
| 2003/0071959 A1 | 4/2003 | Koyama | |
| 2005/0041194 A1 | 2/2005 | Lee et al. | |
| 2015/0338709 A1 | 11/2015 | Yoshida | |
| 2020/0409208 A1* | 12/2020 | Li | ....................... B32B 17/10045 |
| 2021/0033907 A1* | 2/2021 | Yin | .................... G02F 1/133512 |

* cited by examiner

*Primary Examiner* — Edmond C Lau
(74) *Attorney, Agent, or Firm* — Treyz Law Group, P.C.; G. Victor Treyz; Kendall P. Woodruff

(57) ABSTRACT

A system may have windows. The window may have first and second window layers and a layer of material such as guest-host liquid crystal material between the first and second window layers. Electrodes on the window layers may be used to apply electric fields to the guest-host liquid crystal material to adjust the light transmission properties of the window. To ensure that a desired gap between the first and second window layers is maintained, spacers may be formed between the first and second window layers. The spacers may include key-and-lock spacers that have interlocking portions located, respectively, on the first and second window layers. Spacers such as photoresist posts can be attached using adhesive. Hybrid arrangements may also be used in which key-and-lock spacer structures are attached using adhesive bonds.

22 Claims, 8 Drawing Sheets

ADJUSTABLE WINDOWS

This application claims the benefit of provisional patent application No. 63/162,767, filed Mar. 18, 2021, which is hereby incorporated by reference herein in its entirety.

FIELD

This relates generally to structures that pass light, and, more particularly, to windows.

BACKGROUND

Windows are used in buildings and vehicles. Windows may be formed from glass or other transparent material.

SUMMARY

A system may have windows. The system may be a building, vehicle, or other system with an interior region that is separated from a surrounding exterior region by the windows. The windows may be electrically adjustable. In an illustrative arrangement, control circuitry in the system may be used to adjust an adjustable light modulator or other optical component in a window.

A window with an adjustable light modulator may have first and second window layers. The window layers may include first and second respective structural glass layers and/or other transparent layers such as polymer films. Glass and/or polymer in the transparent layers may serve as substrates for electrodes in the adjustable light modulator. The adjustable light modulator may have a layer of material such as a layer of guest-host liquid crystal material sandwiched between the first and second window layers and the electrodes on the window layers.

To ensure that a desired gap is maintained between the first and second window layers even in the presence of mechanical and thermal stress, spacers may be formed between the first and second window layers. The spacers may include key-and-lock spacers that have interlocking portions located, respectively on the first and second window layers. Spacers such as photoresist posts can also be attached to a window layer surface using adhesive to enhance the ability of the spacers to resist separation between the window layers. Spacer structures may have convex surfaces to help shed polyimide rubbing layer that is deposited on the inner surfaces of the window layers facing the liquid crystal layer. The absence of rubbing layer material on the exposed surfaces of the spacer structures helps the adhesive satisfactorily adhere to the spacer structures (e.g., to help attach spacer structures to window layers). If desired, hybrid arrangements may be used in which adhesive helps to secure structures in key-and-lock spacers.

DETAILED DESCRIPTION

A system may have a transparent structure such as a window that includes one or more adjustable layers. The adjustable layers may include an adjustable light modulator layer and/or other adjustable components such as adjustable layers that provide desired amounts of opacity, haze, and/or color cast. A light modulator layer for a window may be based on a guest-host liquid crystal light modulator, a cholesteric liquid crystal light modulator, or other layer with an adjustable opacity. The use of guest-host liquid crystal light modulators may sometimes be described herein as an example. When it is desired to block light transmission through the window, the opacity of the light modulator may be increased. When it is desired to allow light to pass through the window, the opacity of the light modulator may be decreased.

The system in which the window is used may be a building, a vehicle, or other suitable system. Illustrative configurations in which the system is a vehicle may sometimes be described herein as an example. This is merely illustrative. Window structures may be formed in any suitable systems.

When an adjustable light modulator is provided in a vehicle window, the light modulator may be controlled to adjust the vehicle window between transparent and opaque states. The window may be opaque, may be completely transparent, or may be characterized by an intermediate level of light transmission. In a transparent state, a vehicle occupant in the interior of a vehicle can view the environment surrounding the vehicle through the window. In an opaque state, privacy is enhanced because people surrounding the vehicle will not be able to view occupants in the vehicle interior through the window. Ambient light such as sunlight may also be blocked and prevented from reaching the vehicle interior when the window is opaque.

Figure 1:
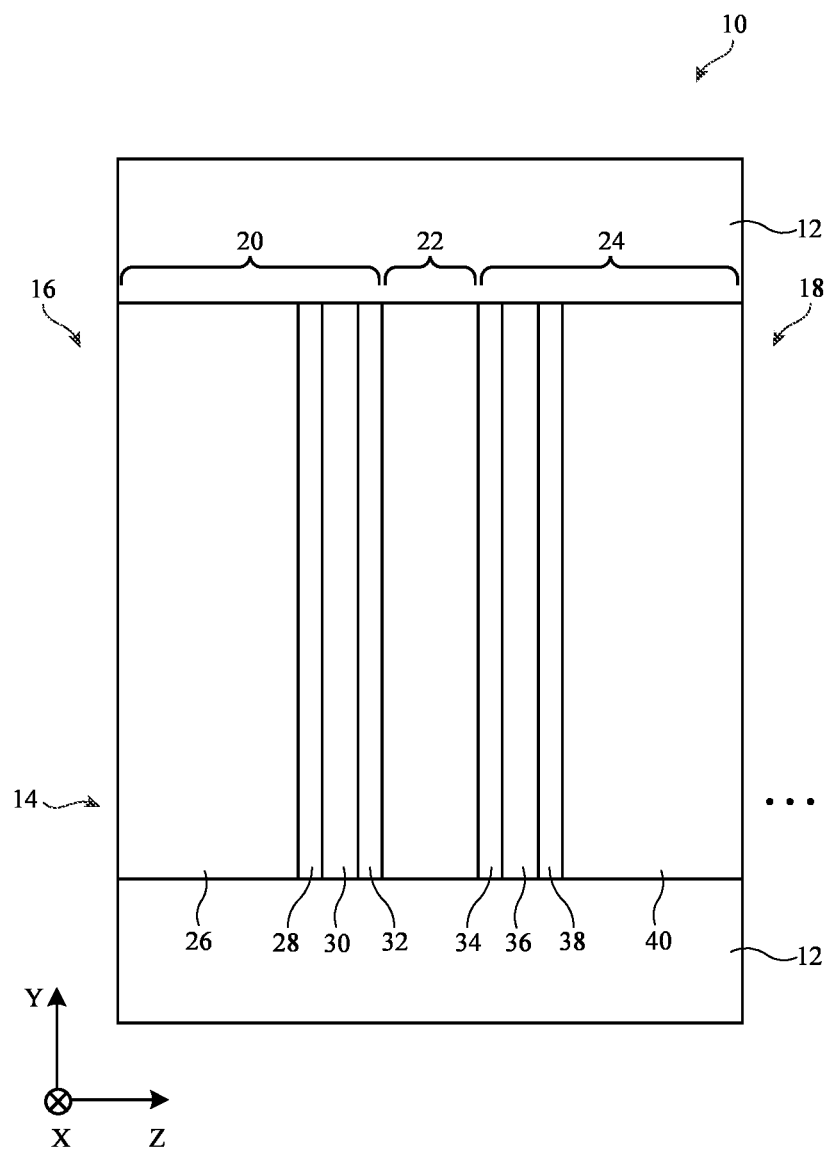
FIG. 1 is a schematic diagram of an illustrative system with a window in accordance with an embodiment.

An illustrative system of the type that may include windows is shown in FIG. 1. System 10 may be a vehicle, building, or other type of system. In an illustrative configuration, system 10 is a vehicle. As shown in FIG. 1, system 10 may have support structures such as body 12. Body 12 may be a vehicle body that includes doors, trunk structures, a hood, side body panels, a roof, and/or other body structures. System 10 may include a chassis to which wheels are mounted, may include propulsion and steering systems, and may include other vehicle systems. Seats may be formed in the interior of body 12. Window 14, which may be a vehicle window, and portions of body 12 may be used to separate interior 18 of system 10 from the exterior environment (exterior 16) that is surrounding system 10.

Windows such as window 14 may be coupled to body 12. The windows in system 10 such as window 14 may include a front window on the front of a vehicle, a moon roof (sun roof) window or other window extending over some or all of the top of a vehicle, a rear window at the rear of a vehicle, and/or side windows on the sides of a vehicle. Window 14 may be flat (e.g., window 14 may lie in the X-Y plane of FIG. 1) or window 14 may have one or more curved portions (e.g., window 14 may have a curved cross-sectional profile and may be oriented to lie generally parallel to the X-Y plane so that a convex surface of window 14 faces outwardly in direction -Z of FIG. 1).

System 10 may include control circuitry and input-output devices. Control circuitry in system 10 may include one or more processors (e.g., microprocessors, microcontrollers, application-specific integrated circuits, etc.) and storage (e.g., volatile and/or non-volatile memory). Input-output devices in system 10 may include displays, sensors, buttons, light-emitting diodes and other light-emitting devices, haptic devices, speakers, and/or other devices for providing output and/or for gathering environmental measurements and/or user input. The sensors may include ambient light sensors, touch sensors, force sensors, proximity sensors, optical sensors, capacitive sensors, resistive sensors, ultrasonic sensors, microphones, three-dimensional and/or two-dimensional images sensors, radio-frequency sensors, and/or other sensors. Output devices may be used to provide a user with haptic output, audio output, visual output (e.g., displayed content, light, etc.), and/or other suitable output.

During operation, control circuitry in system 10 may gather information from sensors and/or other input-output devices such as ambient light measurements and/or other sensor data, user input such as voice commands provided to a microphone, a touch command supplied to a touch sensor, button input supplied to one or more buttons, etc.). Control circuitry in system 10 may use this input in controlling the operation of one or more electrically adjustable components in window 14. For example, control circuitry in system 10 may adjust the amount of opacity (and therefore the amount of light transmission) through window 14 (e.g., for light passing from interior 18 to exterior 16 and for light passing from exterior 16 to interior 18) and/or may make other adjustments to window 14 based on user input, ambient light measurements, other sensor data, and/or other information gathered using input-output devices in system 10.

Window 14 may be formed from one or more layers of transparent glass, clear polymer (e.g., polycarbonate), polymer adhesive layers, and/or other layers. As shown in FIG. 1, a light modulator active layer such guest-host liquid crystal layer 22 may be sandwiched between outer window layer 20 and inner window layer 24. Outer window layer 20 may include multiple sublayer such as outer glass layer 26, optically clear adhesive layer 28, a polymer film such as polymer layer 30, and electrode layer 32. Inner window layer 24 may include sublayers such as inner glass layer 40, optically clear adhesive layer 38, a polymer film such as polymer layer 36, and electrode layer 34. Electrode layers for forming electrodes 32 and 34 may be formed from a transparent conductive material such as indium tin oxide. Electrodes 32 and 34 and guest-host liquid crystal layer 22 form a guest-host liquid crystal light modulator for window 14. Guest-host liquid crystal layer 22 includes dichroic dye guest material in liquid crystal host material. Control signals may be applied to electrodes 32 and 34 during operation to control the electric field across layer 22 and thereby adjust the opacity of the light modulator.

As illustrated by this example, one or more layers of material (e.g., sublayers such as polymer layer 30 and/or glass layer 26) may serve as structural layers that form a supporting substrate for electrode 32 and one or more layers of layers of material (e.g., sublayers such as polymer layer 36 and glass layer 40) may serve as structural layers that form a supporting substrate for opposing electrode 34. This is illustrative. Any suitable set of one or more layers of glass, polymer, transparent ceramic, other materials, and/or combinations of these materials may be used as electrode substrates for electrodes 34 and 36 and window 14 may include one or more structural window layers. In the example of FIG. 1, glass layers 26 and 40 may have sufficient thickness and rigidity to serve as structural layers that provide strength for window 14 and thereby support window 14 within system support structures such as body 12. If desired, one or more polymer layers and/or other structures may be used in providing window 14 with structural support.

Figure 2:
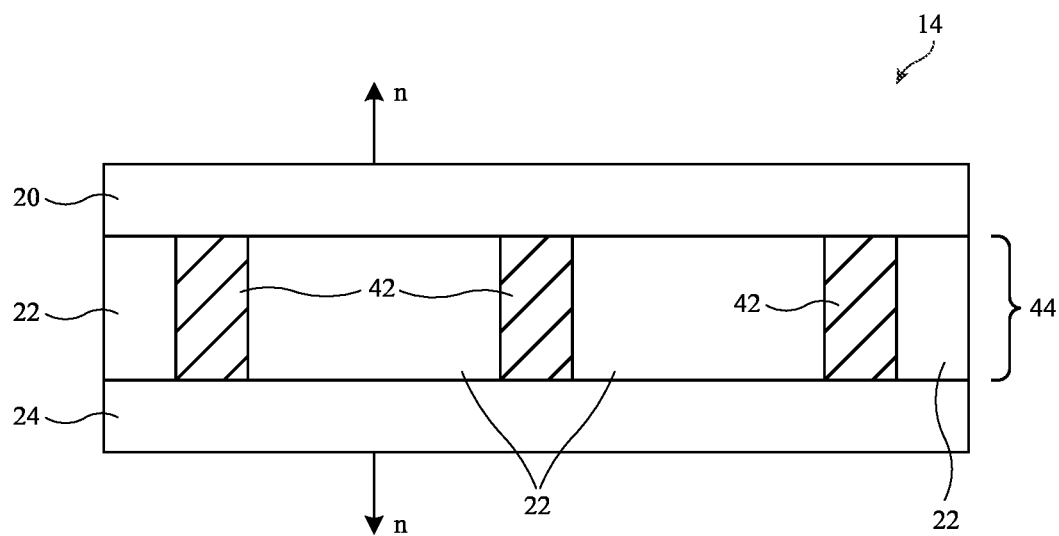
FIG. 2 is a cross-sectional side view of an illustrative window in accordance with an embodiment.

The thickness of layer 22 is preferably constant throughout window 14 to ensure that the transmission of window 14 is uniform. As shown in FIG. 2, support structures such as spacers 42 may be formed between layers 20 and 24 to help maintain a uniform cell gap for liquid crystal layer 22 in light modulator 44. Spacers 42 may be formed from patterned photosensitive materials extending between the opposing inner surfaces of layers 20 and 24 (e.g., between electrodes 32 and 34 on respective layers 30 and 36, etc.) and may therefore sometimes be referred to as photospacers.

Variations in the size of the liquid-crystal-filled gap between electrodes 32 and 34 will tend to affect the amount of light modulation produced by the guess-host material in the gap. As a result, there is a risk that undesired gap thickness variations can create areas with uneven transmission and other undesirable visual features. For example, large dark spots may appear on an otherwise uniformly transparent window if the cell thickness varies too much.

During use of system 10, window 14 may be subject to stress from vibrations, thermal expansion and contraction, gravity, and/or other forces. As one example, gravity may tend to make the liquid of guest-host liquid crystal layer 22 pool near the bottom of window 14 (e.g., when window 14 is mounted vertically in the side of a vehicle). Shear forces (forces tangential to the surfaces of the layers of window 14) and tensile forces (forces that are parallel to surface normals n of the window layers and that are therefore perpendicular to the shear forces) may be produced by these stresses. To ensure that the separation between layers 20 and 24 (and therefore the gaps between electrodes 32 and 34 and the corresponding thickness of layer 22) is constant across window 14, window 14 may be provided with robust spacers. Spaces 42 may, for example, be configured to resist the forces of gravity and stress from vibrations and temperature changes, thereby helping to prevent liquid crystal thickness variations arising from shear and tensile stresses applied to layers 20 and 24.

Figure 3:
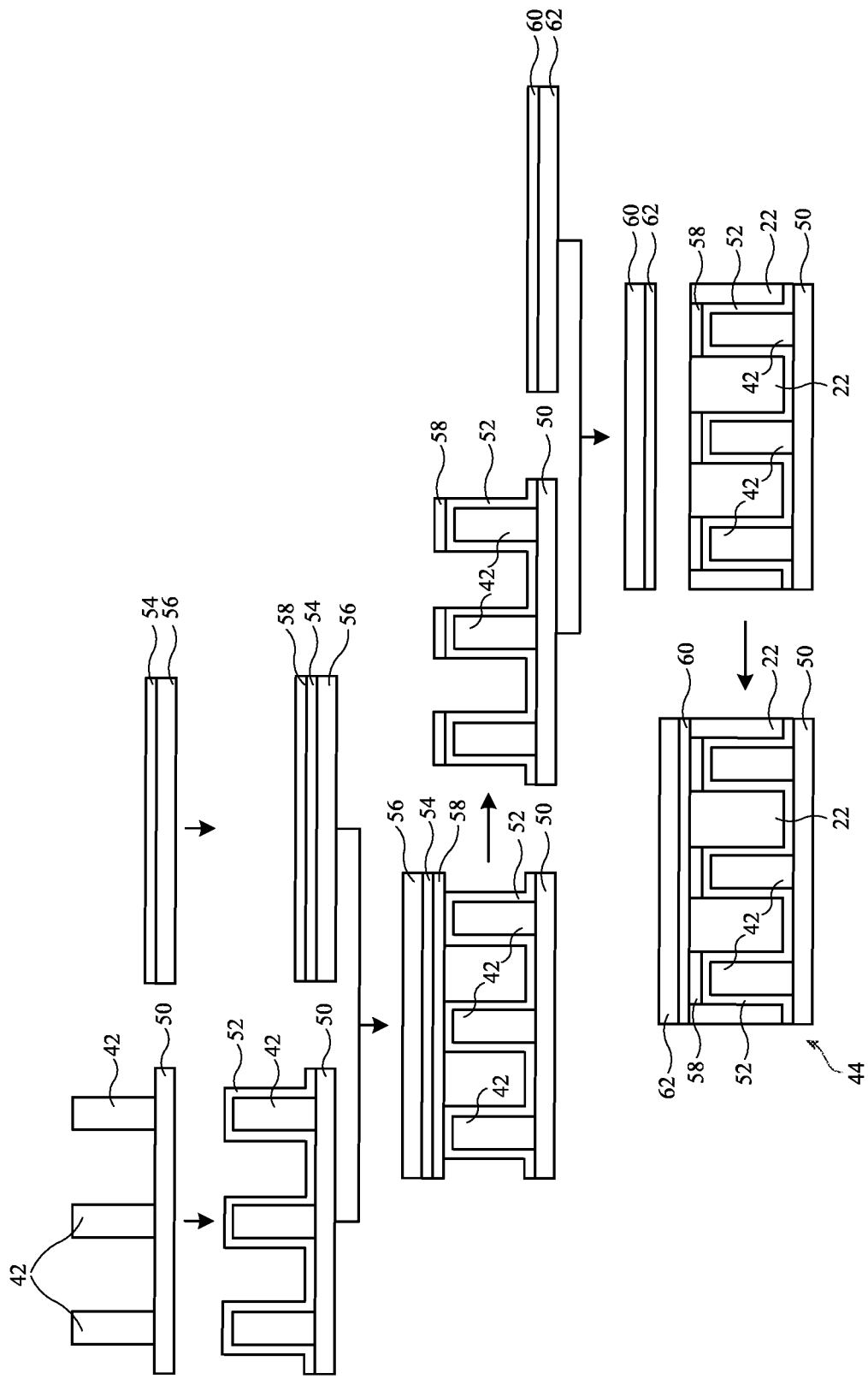
FIG. 3 is a diagram showing illustrative operations involved in forming a window with spacers in accordance with an embodiment.

Illustrative operations for forming spacers 42 are shown in FIG. 3. Initially, a layer of photoresist (e.g., a negative acrylate photoresist or other suitable photoresist) may be deposited onto a substrate and patterned using photolithography to form spacers. As shown in FIG. 3, for example, photoresist may be patterned to form spacers 42 on bottom substrate 50. Substrate 50 may be formed from a polymer layer or other dielectric layer coated with an electrode (e.g., layer 30 with electrode 32) and may optionally include additional window sublayers (e.g., layers 26 and 28). A liquid crystal alignment layer such as polyimide rubbing layer 52 may then be deposited on substrate 50 over spacers 42.

In preparation for application of adhesive to the tops of spacers 42, a non-sticky layer of material such as release liner 54 may be formed on carrier 56. Carrier 56 may be a glass or polymer layer (as examples). Adhesive 58 may be deposited on top of release liner 54.

To apply adhesive 58 to the upper surfaces of spacers 42, carrier 56 is pressed face down on top of spacers 42. This causes adhesive 58 to stick to the tops of spacers 42. Carrier 56 is then removed, which causes release liner 54 to peel away from the portions of adhesive 58 that are stuck to the tops of spacers 42. In this way, patches of adhesive 58 are attached to the exposed outer surface of each spacer 42. Spacers 42 may be columns (posts) with square footprints or may have other suitable spacer shapes.

In preparation for final assembly, a liquid crystal alignment layer such as polyimide rubbing layer 60 may be deposited on the inner surface of substrate 62. Substrate 62 may be formed from a polymer layer or other dielectric layer coated with an electrode (e.g., layer 36 with electrode 34) and may optionally include additional window sublayers (e.g., layers 38 and 40).

Following application of rubbing layer 60 to substrate 62, substrate 62 may be placed face down over substrate 50 and guest-host liquid crystal layer 22 may be dispensed between substrates 62 and 50. Substrate 62 may then be pressed inwardly so that the patches of adhesive 58 on spacers 42 attach substrate 62 to substrate 50, thereby enclosing liquid crystal material 22. After substrate 62 is attached to substrate 50 in this way, adhesive 58 may be cured (e.g., by application of heat, etc.). The presence of cured adhesive 58 attaches spacers 42 to layer 60 and layer 62 (and the electrode in layer 62) and thereby helps prevent lateral and normal movements of these layers relative to substrate 50 that could affect the thickness of liquid crystal layer 22. Glass layers 26 and 40 may be attached to layers 30 and 36 before or after using adhesive 58 to attach spacers 42.

Figure 4:
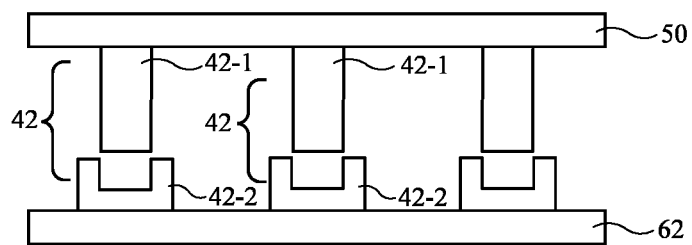
FIGS. 4 and 5 are cross-sectional side views of an illustrative window with interlocking key-and-lock spacers in accordance with embodiments.
Figure 5:
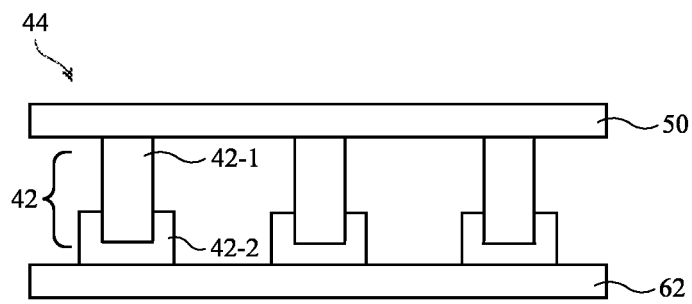
Figure 6:
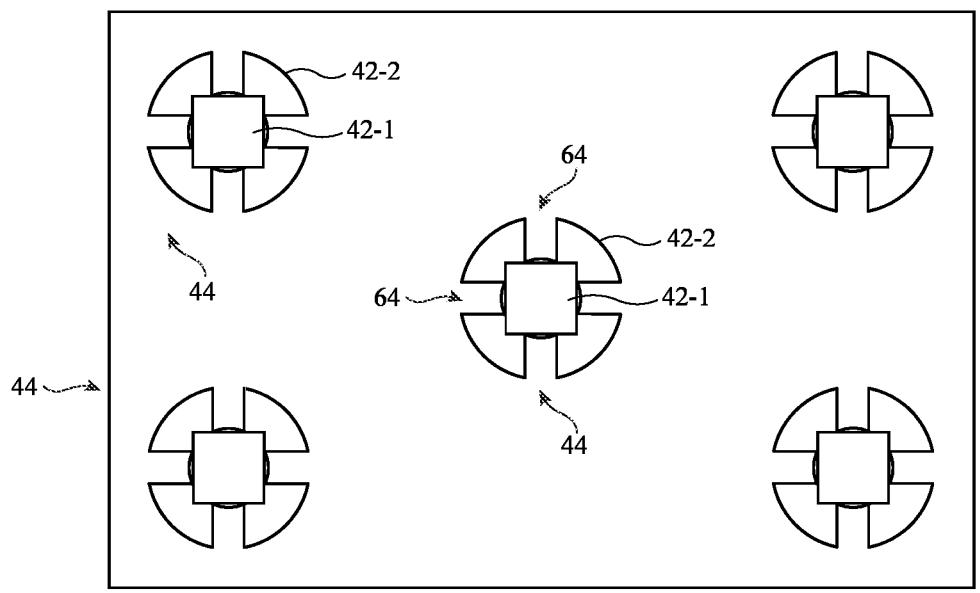
FIG. 6 is a top view of the illustrative spacers of FIGS. 4 and 5 in accordance with an embodiment.

Another illustrative spacer arrangement for modulator 44 is shown in FIGS. 4, 5, and 6. In this example, spacers 42 are formed from interlocking "key-and-lock" spacer structures. FIG. 4 is a cross-sectional side view of key-and-lock spacers 42 prior to assembly. Each spacer 42 has a first portion such as a rectangular post 42-1 and a second portion such as a cup-shaped post holder 42-2 that is configured to mate with the first portion. Posts 42-1 may be formed by patterning photoresist on substrate 50. Post holders 42-2 may be formed by patterning photoresist on substrate 62 (e.g., using a halftone mask). Each post holder 42-2 may have sidewall portions that surround a recess. The recess of each post holder 42-2 may be configured to receive a corresponding tip portion of a respective post 42-1.

After aligning posts 42-1 with post holders 42-2, the tips of posts 42-1 may be inserted into the mating recesses of post holders 42-2 as shown in the cross-sectional side view of modulator layer 44 of FIG. 5. The shapes of the posts and post holders help lock these portions of the spacers together to form a robust spacer structure that secures substrates 50 and 62 together.

As shown in the top view of FIG. 6, post holders 42-2 may have radially extending slots 64. In each post holder 42-2, slots 64 may extend from the central recessed portion of the post holder to the periphery of the post holder. Slots 64 form passageways that allow excess rubbing layer material to exit from the recessed portions of post holders 42-2 (e.g., when posts 42-1 are inserted into the recesses). Because each post holder 42-2 surrounds the tip of the post that has been mated with the post holder, the key-and-lock spacer design of FIGS. 4, 5, ad 6 may help prevent lateral motion (shifting) of substrates 62 and 50 with respect to each other. Friction between the ends of posts 42-1 and the mating surfaces of post holders 42-2 may also help prevent substrates 50 and 62 from separating (e.g., movement in both the normal and lateral directions may be resisted).

Figure 7:
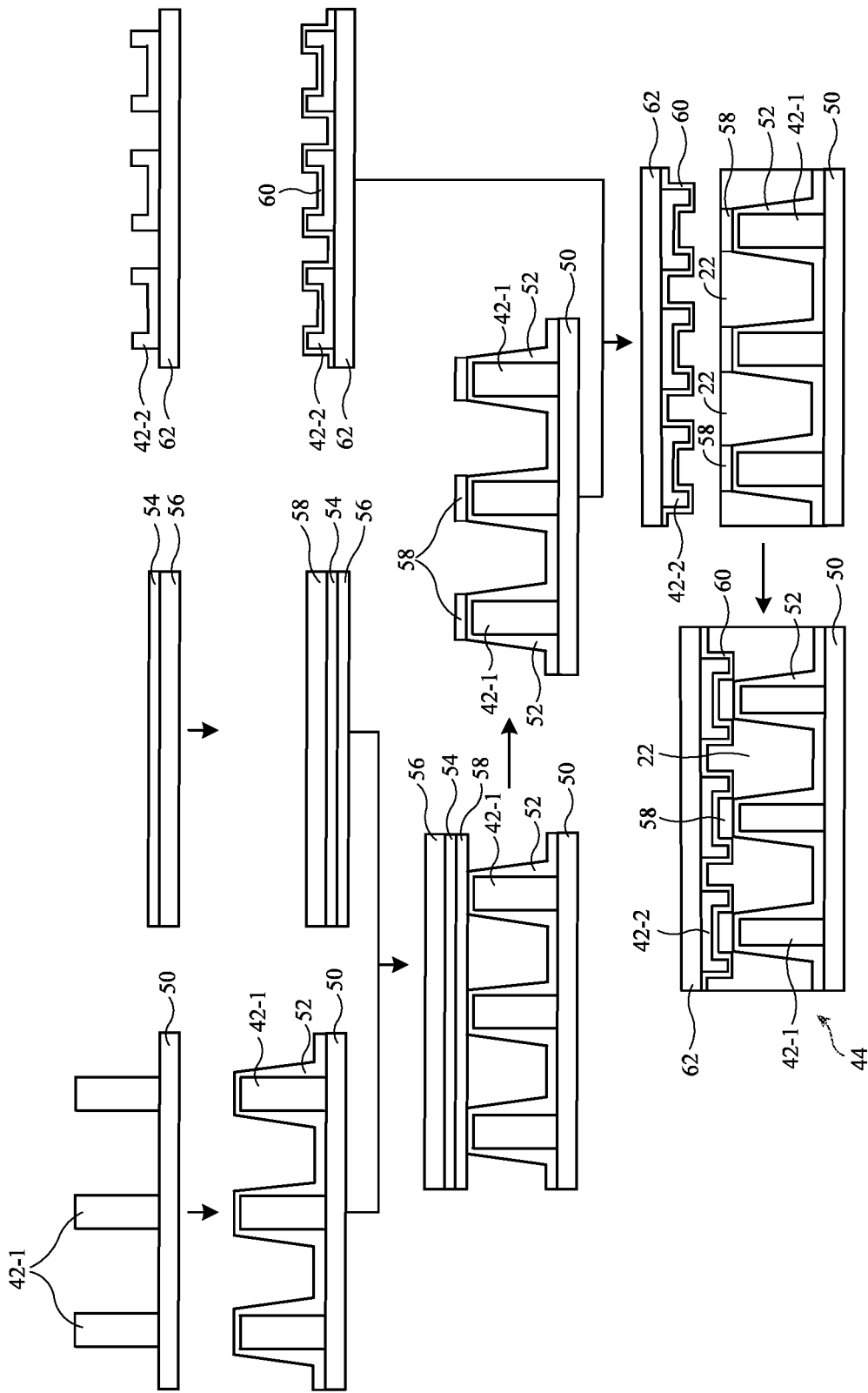
FIG. 7 is a diagram showing additional illustrative operations involved in forming a window with spacers in accordance with an embodiment.

To help strengthen the key-and-lock spacer arrangement of FIGS. 4, 5, and 6, key-and-lock spacers may be provided with adhesive such as adhesive 58 of FIGS. 3, thereby forming hybrid adhesive-attached-key-and-lock spacers. Consider, as an example, the optional assembly operations shown in FIG. 7. As shown in FIG. 7, posts 42-1 may be formed on substrate 50 then covered with rubbing layer 52. In preparation for adhesive attachment, release liner 54 may be formed on carrier 56. A layer of adhesive 58 may then be deposited on liner 54.

Carrier 56 may be inverted and pressed against posts 42-1 to deposit patches of adhesive 58 on the top of each post 42-1. Carrier 56 may then be removed.

Post holders 42-2 may be formed on substrate 62 by patterning a layer of photoresist using photolithography (e.g., using a halftone mask). Rubbing layer 60 may then be deposited on substrate 62 over post holders 42-2.

To form modulator layer 44, liquid crystal layer 22 may be placed between substrates 62 and 50 while top substrate 62 is inverted and positioned to align post holders 42-2 with respective posts 42-1 on bottom substrate 50. Post holders 42-2 and posts 42-1 may be mated with each other by pressing substrates 50 and 62 together. Following the formation of spacers 42 by mating posts 42-1 with post holders 42-2, adhesive 58 may be cured (e.g., by application of heat). Adhesive 58 is present at the top of each post 42-1 and the mating surface of the recess in each corresponding post holder 42-2, so adhesive 58 helps secure posts 42-1 to post holders 42-2. As this example demonstrates, the use of a hybrid arrangement in which adhesive 58 is used in attaching mating key-and-lock spacer structures together may enhance the strength of the connection between substrates 50 and 62. For example, the presence of the sidewalls in post holders 42-2 may help the spacers resist shearing forces (by maintaining the tips of the posts in place) and the presence of adhesive 58 in the recesses of the post holders may help resist forces normal to the surfaces of substrates 50 and 62 (by preventing the tips of posts 42-1 from pulling away from the post holder recesses).

Figure 8:
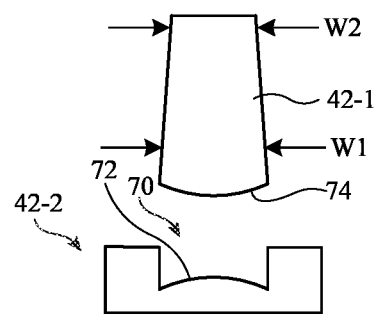
FIGS. 8, 9, and 10 show illustrative spacer structures that may be used in a window in accordance with an embodiment.

If desired, the amount of polyimide rubbing layer material between posts 42-1 and post holders 42-2 may be reduced to help strengthen spacers 42. Consider, as an example, the arrangement of FIG. 8. As shown in FIG. 8, tip 74 of post 42-1 and bottom 72 of recess 70 in post holder 42-2 may be provided with convex surfaces. These convex surface shapes (in which the cross-sectional side view of posts 42-1 and the recessed portions of post holders 42-2 are characterized by curved profiles that bow outwardly) may help polyimide rubbing layer material associated with rubbing layers 52 and 60 to be shed from the spacer structures and thereby flow away from the mating surfaces of key-and-lock spacers 42 of FIG. 8 before the spacers are assembled.

Figure 9:
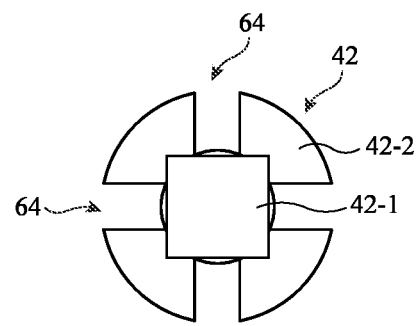

FIG. 9 shows how post holders 42-2 may have slots 64 that allow rubbing layer material that is deposited on bottom 72 in the center of post holder 42-2 to flow outwardly through slots 64 so that this rubbing layer material is not present between tip 74 and bottom 72 when post 42-1 is attached to post holder 42-2 (with or without adhesive 58).

Figure 10:
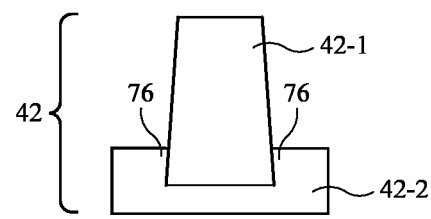

If desired, post 42-1 may have a tapered shape that helps secure post 42-1 to post holder 42-2. As shown in FIG. 8, for example, the tip portion of post 42-1 (near the surface of tip 74) may have a width W1 that is wider than the width W2 of post 42-1 near its base. This tapered shape may sometimes be referred to as a "reverse taper" because in cross-section the protruding tip of post 42-1 tends to be wider than the base of post 42-1. When a post with a reverse taper is pressed into a mating recess in a post holder, the sidewalls of the post holder tend to press radially inwardly towards the tip of the post. As shown in FIG. 10, this results in portions 76 of post holder 42-2 surrounding the tip of post 42-1. The presence of surrounding portions 76 and the reverse taper of post 42-1 help lock post 42-1 within post holder 42-2 and thereby help prevent post 42-1 and post holder 42-2 from pulling apart when stressed.

Figure 11:
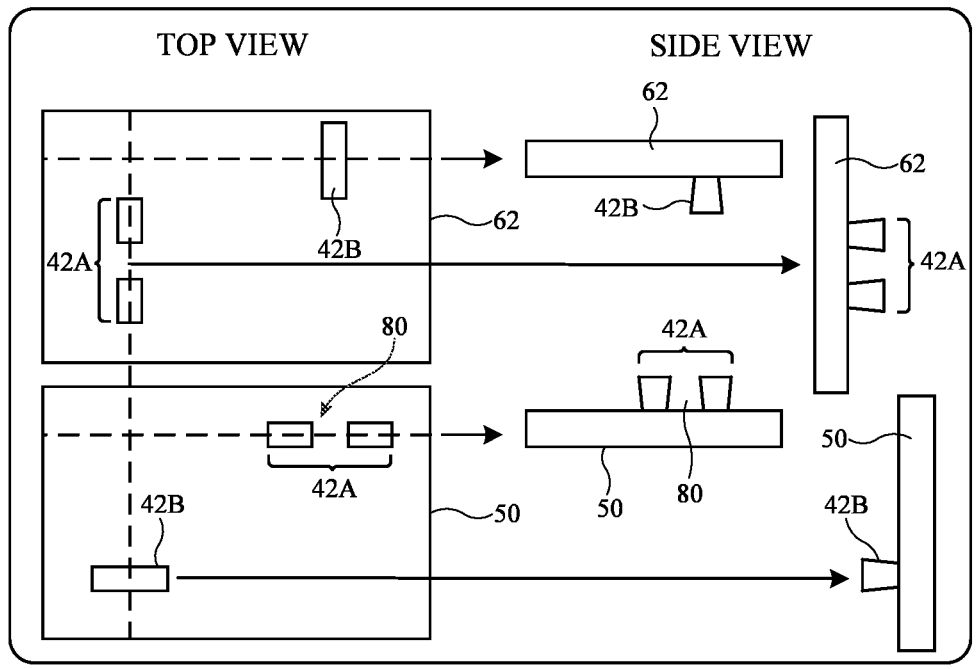
FIG. 11 is a diagram showing top and side views of illustrative window structures with spacers before assembly in accordance with an embodiment.
Figure 12:
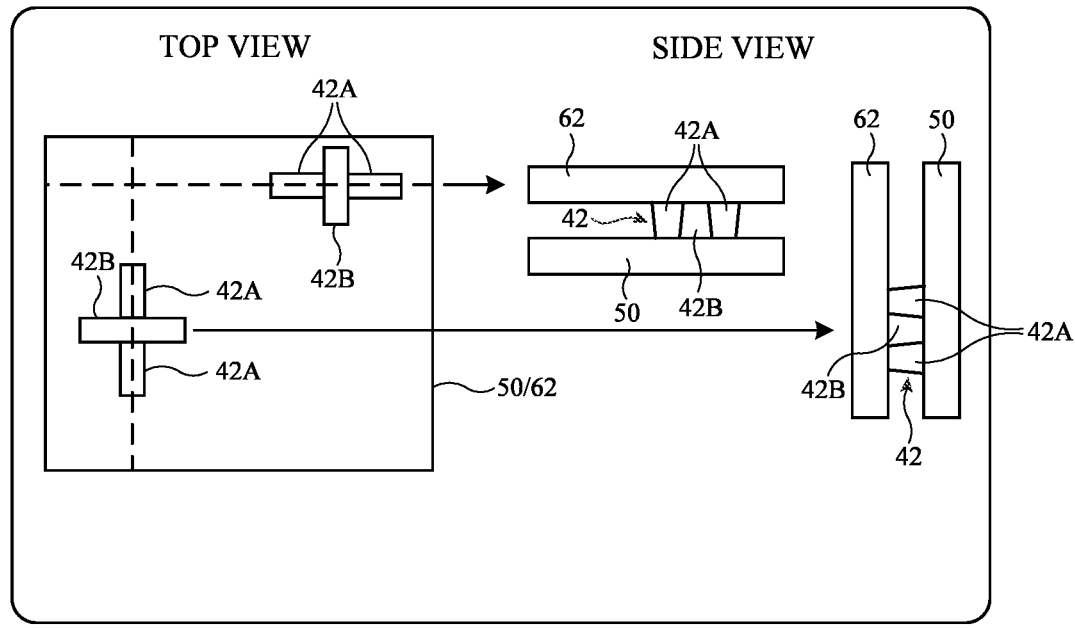
FIG. 12 is a diagram showing top and side views of the illustrative window structures with spacers of FIG. 11 following assembly in accordance with an embodiment.

The mating first and second portions of key-and-lock spacers may be formed using spacer structures with any suitable shapes. FIG. 11 shows a top view and side view of substrates 50 and 62 prior to assembly. In the example of FIG. 11, key-and-lock spacers 42 are formed by first strip-shaped portions (bars) 42A that have slots 80 and second strip-shaped portions (unslotted bars) 42B that are configured to be received within slots 80 when mated. FIG. 12 shows a corresponding top view and side view for substrates 50 and 62 and their associated spacers 42 following assembly. As shown in FIG. 12, each of portions 42A has a slot 80 that has received a mating second portion 42B. Portions 42A and/or 42B may be provided with tapered profiles (e.g., reverse tapers) to help resist separation of substrates 50 and 62.

The presence of rubbing layer material (e.g., polyimide) between spacer structures (e.g., between first and second mating spacer portions) or between spacer structures and the electrodes of modulator 44 may degrade adhesion at adhesive interfaces. For example, in arrangements in which a post and post holder are being joined by a layer of adhesive, the presence of residual rubbing layer material between the post and post holder may reduce adhesion of the adhesive layer being used to attach the surfaces of the post and post holder together. As another example, a spacer may be attached to the surface of an electrode using adhesive. In the presence of rubbing layer material on the top of the spacer, the adhesive that is placed on the top of the spacer to attach the spacer to the electrode may exhibit reduced adhesion to the spacer.

Figure 13:
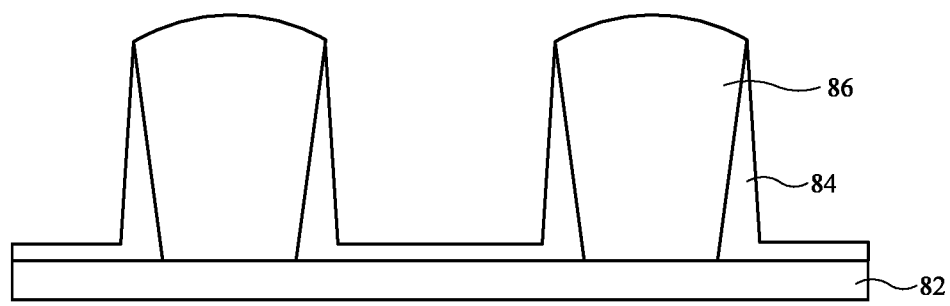
FIG. 13 is a cross-sectional side view of illustrative spacer structures in accordance with an embodiment.

To help avoid the lowering of adhesive bond strength due to the presence of rubbing layer material at adhesive joint interfaces, spacers and other structures in modulator 44 may be provided with concave surfaces. In the example of FIG. 8, tip 74 of post 42-1 and corresponding bottom 72 of recess 70 in post holder 42-2 in a key-and-lock spacer have convex surfaces that help shed rubbing layer polymer. In the illustrative example of FIG. 13, post-shaped spacer 86 has a convex tip surface. Spacer 86 of FIG. 13 may form a spacer such as spacer 42 of FIG. 2 (as an example). In some configurations convex surfaces may be provided to other types of spacers such as portions of key-and-lock spacers on which adhesive joints are formed. Rubbing layer 84 of FIG. 13 may be formed from polyimide or other rubbing layer polymer. Due to the convex shape of the tip of spacer 86, rubbing layer 84 is shed from the tip of spacer 86 (e.g., after liquid polyimide is dispensed, the liquid will flow down the sides of spacer 86 away from the convex tip). This leaves the convex tip of spacer 86 uncovered with rubbing layer material, so that adhesive bonds can be securely formed at the convex tip.

The foregoing is merely illustrative and various modifications can be made to the described embodiments. The foregoing embodiments may be implemented individually or in any combination.

What is claimed is:

1. A system, comprising:
    a body; and
    a window in the body that separates an exterior region from an interior region, wherein the window comprises:
        an outer window layer;
        an inner window layer separated from the outer window layer by a gap;
        a guest-host liquid crystal layer in the gap between the outer and inner window layers; and
        spacers coupled between the inner and outer window layers to maintain the gap, wherein each of the spacers has a first portion on the inner window layer and a second portion on the outer window layer, wherein the second portion of each spacer has slots and a recess, and wherein the recess is configured to receive a mating tip of the first portion.

2. The system defined in claim 1 further comprising:
    a first rubbing layer on the inner window layer; and
    a second rubbing layer on the outer window layer, wherein:
        the first portions comprise photoresist posts having respective tip areas that are not covered by the first rubbing layer; and
        the second portions comprise photoresist post holders with respective post holder areas that are not covered by the second rubbing layer.

3. The system defined in claim 1 wherein the spacers are formed from photoresist.

4. The system defined in claim 3 wherein the inner window layer is coated with a first transparent electrode layer, wherein the outer window layer is coated with an opposing second transparent electrode layer, and wherein each spacer extends between the first and second transparent electrode layers.

5. The system defined in claim 4 further comprising adhesive associated with each spacer that attaches the first portion to the second portion in that spacer.

6. The system defined in claim 5 wherein the first portions comprise rectangular posts.

7. The system defined in claim 5 wherein the second portions comprise post holders.

8. The system defined in claim 5 wherein the first portions comprise posts and the second portions comprise post holders that respectively receive the posts.

9. The system defined in claim 4 further comprising a first rubbing layer on the first transparent electrode layer and a second rubbing layer on the second transparent electrode layer.

10. The system defined in claim 9 wherein, in each spacer, the first portion has a first convex surface configured to shed at least some of the first rubbing layer and the second portion has a second convex surface configured to shed at least some of the second rubbing layer.

11. The system defined in claim 9 wherein the first portion of each spacer has a convex surface at the tip.

12. The system defined in claim 1 wherein the first portion of each spacer comprises a post with a reverse taper.

13. The system defined in claim 1 wherein the body comprises a vehicle body and wherein the window comprises a vehicle window.

14. A system, comprising:
   a body; and
   a window in the body that has:
      first and second transparent layers;
      rubbing layer material on the first transparent layer;
      spacers between the first and second transparent layers to maintain a gap between the first and second transparent layers, wherein the spacers include passageways for receiving excess portions of the rubbing layer material; and
      a liquid crystal layer in the gap, wherein the spacers each include a photoresist post attached to the second transparent layer with adhesive.

15. The system defined in claim 14 wherein the body comprises a vehicle body and wherein the window comprises a vehicle window.

16. The system defined in claim 15 wherein the liquid crystal layer comprises a guest-host liquid crystal layer and wherein the first transparent layer comprises a first polymer layer coated with transparent conductive electrode material and wherein the second transparent layer comprises a second polymer layer coated with transparent conductive electrode material.

17. The system defined in claim 16 wherein the photoresist posts comprise posts with reverse tapers.

18. The system defined in claim 16 wherein the photoresist posts have convex tips that are not covered with the rubbing layer material.

19. The system defined in claim 18 wherein the adhesive attaches the convex tips to the second polymer layer coated with the transparent conductive electrode material.

20. A vehicle window, comprising:
   first and second window layers separated by key-and-lock spacers, wherein each key-and-lock spacer has a first spacer portion on the first window layer and a second spacer portion on the second window layer that mates with the first spacer portion, and wherein the second spacer portion has slots extending radially outward from the second spacer portion; and
   a guest-host liquid crystal layer between the first and second window layers.

21. The vehicle window defined in claim 20 wherein the first spacer portions comprise bars of photoresist with additional slots and wherein the second spacer portions comprise bars of photoresist that are received within the additional slots.

22. The vehicle window defined in claim 20 wherein the first and second spacer portions have tapered sidewalls.

* * * * *